United States Patent

[11] 3,634,830

[72] Inventor Herbert B. Baskin
Mohegan Lake, N.Y.

[21] Appl. No. 833,037
[22] Filed June 13, 1969
[45] Patented Jan. 11, 1972
[73] Assignee International Business Machines Corporation
Armonk, N.Y.

[54] MODULAR COMPUTER SHARING SYSTEM WITH INTERCOMPUTER COMMUNICATION CONTROL APPARATUS
1 Claim, 3 Drawing Figs.

[52] U.S. Cl. .......... 340/172.5
[51] Int. Cl. .......... G06f 15/16
[50] Field of Search .......... 235/157; 340/172.5

[56] References Cited

UNITED STATES PATENTS

| | | | |
|---|---|---|---|
| 3,253,262 | 5/1966 | Wilenitz et al. | 340/172.5 |
| 3,219,980 | 11/1965 | Griffith et al. | 340/172.5 |
| 3,287,705 | 11/1966 | Rosenblatt et al. | 340/172.5 |
| 3,323,109 | 5/1967 | Hecht et al. | 340/172.5 |
| 3,345,618 | 10/1967 | Threadgold | 340/172.5 |
| 3,350,689 | 10/1967 | Underhill et al. | 340/172.5 |
| 3,374,465 | 3/1968 | Richmond et al | 340/172.5 |
| 3,400,372 | 9/1968 | Beausoleil et al. | 340/172.5 |
| 3,480,914 | 11/1969 | Schlaeppi | 340/172.5 |

*Primary Examiner*—Gareth D. Shaw
*Assistant Examiner*—Melvin B. Chapnick
*Attorney*—Hanifin and Jancin

ABSTRACT: A bank of interchangeable computers are provided, each of which is a memory/processor pair, the computers being respectively assigned to process terminal jobs as they arrive from a remote terminal. One of the computers serves as the master or control processor and supervises the collection and distribution of messages from and to the remote terminal, a disk drive suitably being provided for each connected terminal. A cross point switching network permits any of the disk drives to be connected to any computer of the bank, under the control of the control computer. Thus, while each active terminal is operatively related to a dedicated disk drive each terminal user may share the control computer with many other terminal users in a simple manner. The ratio of users to computers is dependent on the size and power of the computers which are employed and the computation requirement of the particular combination of users.

INVENTOR
HERBERT B. BASKIN

BY Isidore Match
ATTORNEY

MODULAR COMPUTER SHARING SYSTEM WITH INTERCOMPUTER COMMUNICATION CONTROL APPARATUS

BACKGROUND OF THE INVENTION

This invention relates to computer systems. More particularly, it relates to a novel general purpose interactive multiterminal computing system.

Heretofore, attempts at providing multiterminal computer systems have resulted in arrangements which can be conveniently termed dedicated function multiterminal systems, specific language multiterminal systems, and general purpose multiterminal system.

Of the foregoing, the dedicated multiterminal systems were the most prevalent of the earlier time-shared systems. Conceptually, these systems are the simplest. Some examples of such systems are airline reservations systems, military enemy surveillance systems and computer assisted instructional systems. A designer of this type of system can determine, from the range of specific application functions, what a good set of operating system tasks would be, and then proceed to design a supervisory program to implement this set of tasks in a manner such as to satisfy the functional requirements of the dedicated application. In this situation, therefore, the scope of the design problem is limited since the conditions of the use of such an operating system are predictable. Usually, the required system software is intended for use with a single hardware consideration with only limited variations in available I/O (input/output) resources.

The attempts at providing specific language multiterminal systems have resulted in several practical and efficient arrangements, such arrangements however usually being more complex than dedicated function multiterminal systems. Designers of specific language multiterminal systems are able to take advantage of the various restrictions which are rendered possible when the particular language requirements are known in advance. Advance knowledge of the characteristics, i.e., size, structure, etc., of the possible data sets also presents the system designer with a good opportunity to tailor the data management subsystem so as to achieve some reduction in complexity and, possibly, a concomitant increase in efficiency.

Multiterminal systems servicing more than one application (or more than one language) have been, as so far described hereinabove, characterized as dedicated function or specific language since the union of the two or three applications or languages can be treated as the dedicated function or specific language to be implemented.

The latter systems have been produced in a variety of language and application areas. These systems usually suffer from the drawback that programs developed for any one such system are not usable on any other, even when the source language or applications are substantially the same. In addition, the exploitation of the various opportunities for simplification and optimization has precluded their being implemented so as to be configurable over a reasonably wide range of system sizes, for example, number of channels and memory size. Thus, users tend to become locked into such systems and cannot reasonably move to another one even when the language similarity is sufficient.

The third type of multiterminal system mentioned above is one in which no significant initial restrictions are placed on the language processor that can be run under the supervisory program. The aims of the designers of this type of system of are to provide rapid response, highly available, multiple language terminal support, supplemented by a comprehensive set of programming and user aids for writing and debugging programs, building and using libraries, examining data sets, text editing, remote access of various I/O devices, etc.

The systems of such third type tend to be extremely complex, even in the planning stage. There is yet to be demonstrated the actual design and implementation of a example of such a system which has acceptable response performance, is maintainable by nondesigners, is economically competitive with other ways of doing a job, and presents an acceptable level of availability. The probability is that, at this juncture, enough is not understood about the various requirements and their technical implications to be able to determine if the many performance requirements of such third type system can be reconciled.

Accordingly, it is an important object of this invention to provide a general purpose multiterminal system which is not restricted to a configuration that is similar to batch oriented systems but which is differently programmed in terms of both system software and applications programs.

It is another object to provide a general purpose multiterminal system which is not differently programmed.

It is a further object to provide a general purpose multiterminal system which is a highly available system at relatively low cost.

It is still another object to provide a general purpose multiterminal system wherein economic configurations are possible for a substantial range of systems sizes.

It is still a further object to provide a general purpose multiterminal system wherein problem programs developed by remote terminal users can be run on a dedicated batch system if compatible computers are used in the system.

SUMMARY OF THE INVENTION

Generally speaking and in accordance with the invention, there are provided a plurality of substantially interchangeable computers, each of the computers being adapted to be selected as a problem or control computer whereby, by a chosen selection, one of the computers functions as a control computer and the remaining computers functions as a control computer and the remaining computers function as problem computers. Intercomputer communication control means is provided, in circuit with the computers, for enabling a control and data link between a selected control computer and the remaining problem computers. There is also provided file switch means in circuit with the computers and adapted to have a plurality of disk drives attached thereto.

The foregoing and other objects, features and advantages of the invention will be apparent from the following more particular description of the preferred embodiment of the invention, as illustrated in the accompanying drawings.

DESCRIPTION OF A PREFERRED EMBODIMENT

The concept underlying the organization of a system according to the invention and suitably termed a modular computer system is the provision of a set of computers, i.e., central processor-memory pairs, which is shared among a number of terminal users by assigning a computer to each user whenever he has some computation to perform. The computers in the available set are preferably all alike or, at least, interchangeable. One of the computers in the set is assigned the task of performing some elementary supervisory functions, such computer usually being termed the "control" computer. The functions of this control computer include message switching activities, scheduling the use of the other computers, and performing some data manipulation for the terminal user. The remaining computers of the set are directly devoted to the performing of the terminal user's processing, under the supervision of the control computer.

Figure 1:
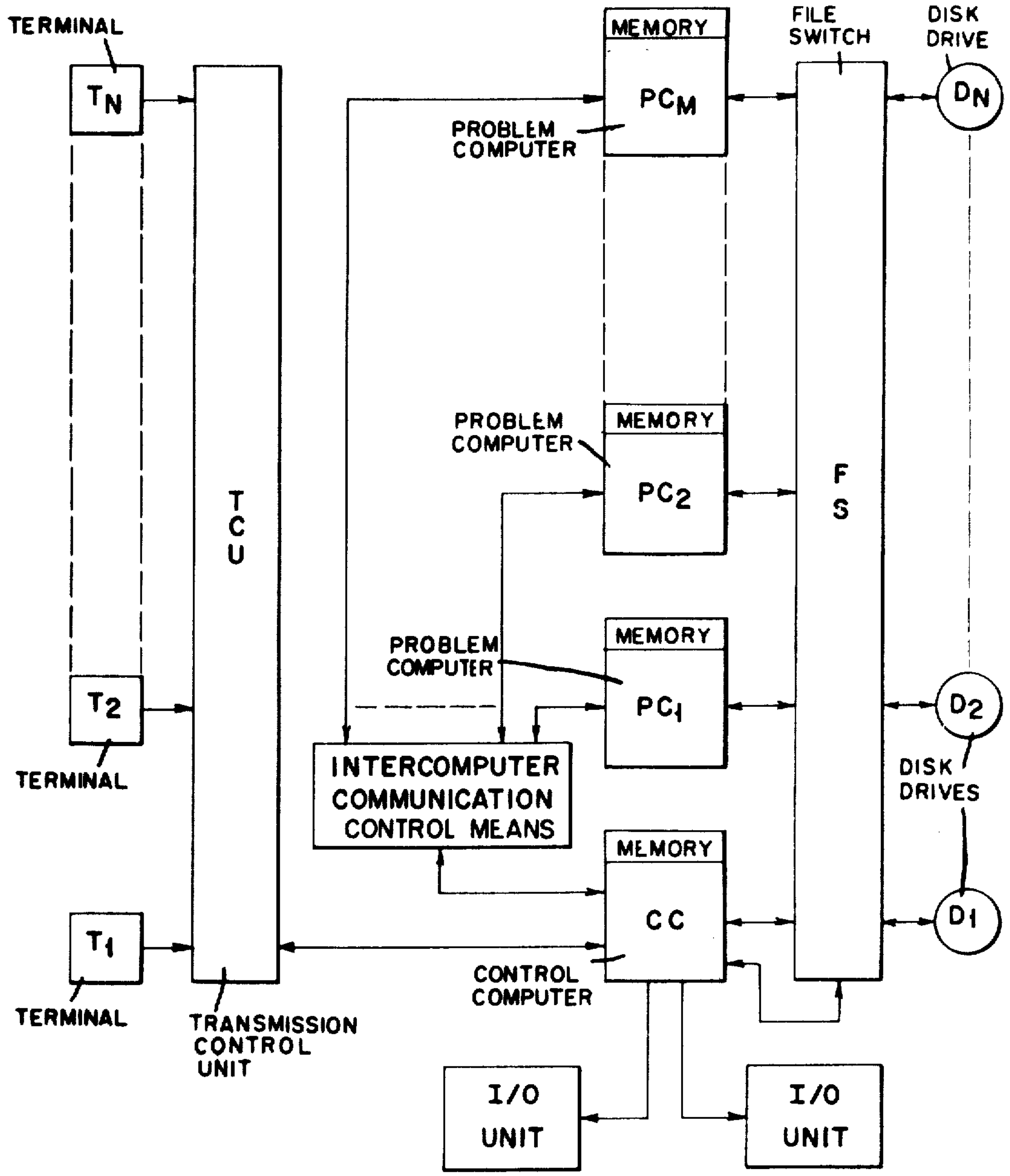
FIG. 1 is a block diagram of a modular computing system constructed according to the invention.

As shown in FIG. 1, the components of the modular computer sharing system (MCS) according to the invention are intrinsically structured in modular form thereby providing high availability and permitting easy system expansion or contraction. The system suitably comprises M problem computers (PC) which may be of the general purpose type such as those designated 1130 and manufactured by the IBM Corporation and a control computer (CC) which may also be an IBM 1130 and which supervises the activity of a transmission control unit (TCU). The transmission control unit may suitably be one such as is manufactured by the IBM Corporation and designated IBM 2702 and may have N terminal ports to handle N terminals, $T_1$ through $T_N$, the terminals suitably being of the designated IBM 2741.

The system also includes an intercomputer communication control means which suitably comprises a channel to channel intercomputer communication control unit associated with each computer respectively and which is operative to transfer words between the computers. A file switch (FS) is included which may suitably be one such as the IBM 2914 cross point switch. The latter switch is a 4×20×40 switch, i.e., it connects 20 lines from a disk file and 20 lines to a disk file between each computer and any one disk. One specified disk is attached to a specified computer at any given time. Attached to the file switch, there are attached N disk drives $D_1$ through $D_N$, a disk drive suitably being one such as the IBM 2310. The system may also comprise input output equipment such as a card reader, a card punch, a printer, etc. which in FIG. 1 are depicted as I/O units and which communicate with designated control computer CC.

Each of the N active or connected terminals is paired with a disk drive so that each terminal user utilizes his private disk pack when operating on line. The terminals suitably include an I/O typewriter and communication hardware and are respectively attached through a public dialing network, i.e., data sets, to the transmission control unit (TCU) which provides the multiplexing, buffering and control functions required to transfer data to the control computer. Thus, the terminals can be located remotely from the system. In operation, a terminal appears to be a dedicated computer having the user's private disk pack.

The transmission control unit (TCU), under the control of the control computer (CC) in its multiplexing function receives characters from the terminals, deserializes and transfers the characters to the control computer or performs the reverse function, i.e., receives characters therefrom and serializes them for transmission to the terminals. Effectively, the TCU operates in the manner of a conventional teleprocessing system.

The control computer is the major system overhead since it control the total system. In this connection, it performs all of the system supervisory functions and, as such, executes the tasks usually performed by the operating system of a single central processor unit system. Since all of the computers are alike or, at least, interchangeable, the assignment of one of them to the function of the control computer (CC) is arbitrary and may be altered in the event of suspected equipment malfunction. The control computer (CC) interfaces with an ICCU and the disk drives through the file switch (FS) as do the problem computers (PC's) and, in addition, controls the transmission control unit (TCU), the file switch (FS), the I/O units such as the card reader and card punch and the printer.

An intercomputer communication control unit (ICCU) provides both the data and control link between a control computer (CC) and the problem computers (PC's). The selection of a data path from the control computer (CC) to any problem computer (PC) is determined by control from the selected control computer (CC) itself. No data path directly between two problems computers (PC's) is established. Programs to be executed that are received from the terminals are transferred to the assigned PC's through an ICCU.

Each of the problem computers (PC's) has two system interfaces, viz. an intercomputer communication control unit (ICCU) and the file switch (FS). A problem computer (PC) is attached to a user's disk drive through the file switch (FS) interface. Each such connection, of which there may be simultaneously (M+1), is determined and effected by the control computer (CC) through a control interface. Each problem computer (PC) receives messages and control information through an intercomputer communication control unit (ICCU) from the control computer (CC) and utilizes the user's disk pack which is located on a disk drive connected through the file switch (FS).

The file switch (FS) can enable the attachment of (M+1) of the N disk drives to (M+1) computers since each computer is suitably provided with one disk drive interface whereby one disk drive can be attached through the file switch (FS) to any one computer at any time. The file switch is controlled by the control computer (CC) and is employed to attach the disk drive containing the user's disk pack to the problem computer (PC) executing his program.

The N disk drives preferably utilize removable disk packs for user data storage whereby each user has his own disk pack located at the system of use when he is operating at a terminal. The number of disk drives (N) is equal to the number of attachable terminals so that each terminal user can utilize his disk pack which is loaded on a disk drive while he is operating at a terminal.

The modular structure of the system, according to the invention, permits it to be adjusted to fit many operational requirements. For example, the number of terminal-disk drive pairs can be increased or decreased which commensurately decreases or increases the system performance capabilities. The system's processing performance capabilities can be increased or decreased by increasing or decreasing the number of problem computers (PC's ) in the system. More storage can be made available by adding disk drives in excess of the number of terminals (N). The transmission control unit (TCU), the file switch (FS), and the intercomputer communication control unit are modular and can be changed at will.

In considering the operation, the systems users each operate independently from individual typewriter terminals attached to the transmission control unit (TCU) through data sets and the telephone dial network. Each user is provided with a private disk pack located in the system area for online use when operating from a terminal.

To initiate operation, each user first attaches his terminal to an available terminal port on the transmission control unit (TCU) by telephone dialing and placing the data set in the data set mode. The control computer (CC) responds by requesting the user to enter terminal initialization information, i.e., user identification, file required, special control information, etc. Upon receipt of this information, the control computer (CC) informs the system operator, on the printer, that this user is active and that his required disk pack should be loaded on a specific disk drive assigned by the control computer (CC).

As the disk file is being readied, the user may complete the sign on procedure and begin to enter his program on data from the terminal. The control computer (CC) accumulates his program character by character and assists him in creating programs and data files through command language facilities such as text editing. Upon the receipt of an end-of-message character, the control computer (CC) assigns a problem computer for the user's task or puts the task in a queue for subsequent processing when a problem computer (PC) becomes available. When a problem computer (PC) is available, the control computer (CC) assigns it to the user's task, attaches it to the disk drive containing the user's disk pack, and initiates the transfer of the user's message from the control computer (CC) to the assigned problem computer (PC) through an intercomputer communication control unit (ICCU). Such a transmission is initiated by the control computer's interrupting the selected problem computer (PC). The problem computer (PC) is interrupted at its lowest priority interrupt level to permit any pending interrupt processing on higher interrupt levels to be completed prior to the processing of the interrupt from the control computer (CC). While receiving the user's message through an intercomputer communication control unit (ICCU), the assigned problem computer (PC) initiates transfer of the user's control program to core from the user's disk. After the transfer has been completed, the problem computer (PC) executes the user's program.

Upon the completion of the processing of the user's task or job step, the problem computer (PC) initiates transfer of the core image to the user's disk pack and transfers the execution results to the control computer (CC) through an intercomputer communication control unit (ICCU). If the job step exceeds the maximum allowable processing time and another job is awaiting processing, the control computer instructs the problem computer (PC) to transfer the present contents of core to the user's disk and to transfer the processing status to the control computer (CC) for subsequent continuation of processing. After the transferring of all of the execution results, or of status to the control computer (CC), the problem computer (PC) interrupts the control computer (CC) to indicate that transfer has been completed. The control computer (CC) then disconnects the disk drive containing the user's disk pack from the assigned problem computer (PC) and assigns that problem computer (PC) the next task in the queue. If the task being processed has been completed, the results are transferred to the user's terminal through the transmission control unit for the user's examination.

If the task being processed was not completed, the task is placed in the queue for subsequent processing. Preferably, the maximum allowable processing time is a quantity which can be readily altered. Suitable processing times may be in the order of about 30 seconds, such time desirably being a function of other system variables, such as queue length and terminal response times.

Figure 2:
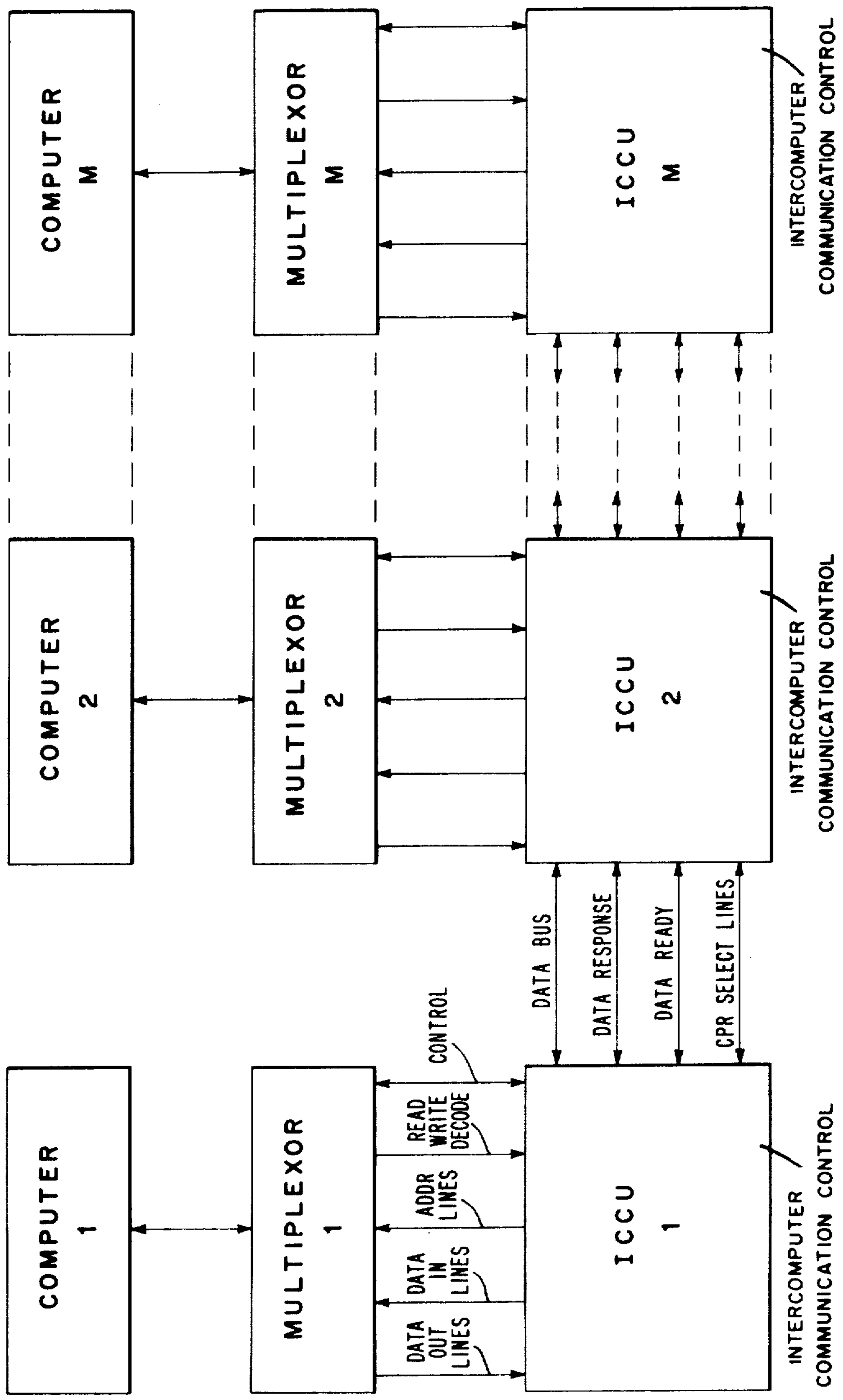
FIG. 2 is a block diagram showing the relationship between the computers and the intercomputer communication control means in the the system shown in FIG. 1.

FIG. 2 shows a suitable implementation of the intercomputer communications scheme in accordance with the invention. There is seen therein a plurality of computers 1 through M which intercommunicate with a corresponding plurality of multiplexors 1 through M, each multiplexor suitably being of the type manufactured by the International Business Machines Corporation and designated by the numeral 1133. Each computer multiplexor combination has associated therewith its own intercomputer communication control unit, the intercomputer communication control units being shown in FIG. 2 as comprising ICCU's 1 through M. For clarity of exposition, communication paths between the ICCU's are shown to extend between adjacent ones in the figure. However, it is realized that an individual ICCU intercommunicates with all of the other ICCU's and various lines therefore will go from a single ICCU to all of the others. The lines between respective ICCU's comprise a data bus along which there are transmitted in parallel a desired number of bits, a data response line, a data ready line and a plurality of computer select lines, the latter plurality being equal to the amount of bits required to provide a binary number at least equal to N.

Between a multiplexor and its associated ICCU, there are provided a plurality of communication lines, viz, data out lines from the multiplexor to the ICCU, data in lines from the ICCU to the multiplexor, address lines from the ICCU to the multiplexor, a read/write command decode line from the multiplexor to the ICCU and the control line which enables intercommunication between the multiplexor and the ICCU.

In considering the aforementioned lines, the data bus lines are employed to transmit data back and forth between the selected control computer and the remaining problem computers. The computer select lines are under the control of the control computer and enable the addressing of the appropriate problem computer. The data ready line informs a receiving computer that data is present on the data bus. The data response line is used to inform the transmitting computer that data has been received. The selection of the control computer is arbitrarily made by the system operator.

Figure 3:
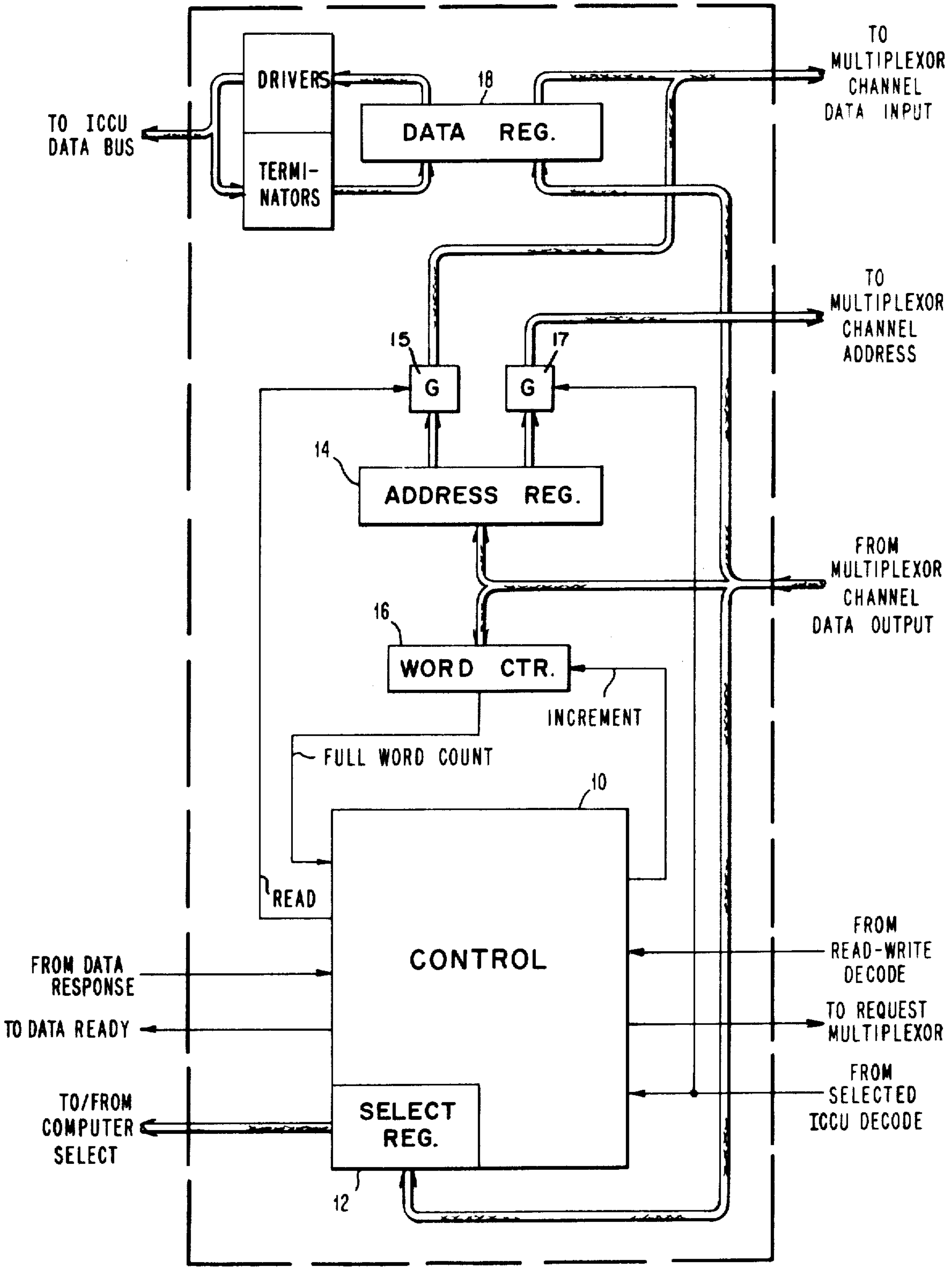
FIG. 3 is a block diagram of an illustrative embodiment of an arrangement suitable for use as an intercomputer communication control unit.

Reference is now made to FIG. 3 wherein there is shown an embodiment suitable for use as an ICCU in accordance with the principles of the invention. An ICCU functions to establish communication paths between the control computer and the select problem computer and transfers messages.

There now follows an explanation of the procedure which is employed with the embodiment shown in FIG. 3 to establish a communication path between a selected control computer and the problem computer. In this connection, let it be assumed that a given computer is selected as a control computer. In such situation, it initiates a write order and its select register 12 in its control stage 10 is loaded and the address of a selected problem computer is loaded into the address register 14. A message is sent to he selected problem computer on the data bus which informs the latter of its selection. The latter computer ascertains that it has been selected by issuing a read instruction to the control computer. The response is sent on the response line from the selected problem computer to the control computer over the data response line during the execution of the read instruction issued from the problem computer. In this manner, a communication path is established between the control computer and the selected problem computer.

The message transfer takes place by the conditions set up by initiate write and read instructions. The control computer, after receiving the data response from the selected problem computer which indicates that the latter is aware that it is about to receive data, obtains a cycle from its own memory. The first word of the data block to be transferred contains the word count which is kept track of in a word counter 16, the word count being the number of words in the data block. The data is loaded into the data register of the control computer and the data ready line of the control computer is made active. The problem computer upon sensing a data ready signal loads the contents of the control computer's data register into its data register from the data bus and a count is started in the word counter 16 of the problem computer. The ICCU of the problem computer requests a cycle from its memory and stores the contents of its data register into its memory at which point it steps its address register 14 by one and decrements its word count by one. When this is done, the problem computer then sends a data response to the control computer signifying that it has received the data. The ICCU of the control computer, upon receiving the data response, increments its address register by one and decrements its word counter by one. This process continues until the setting in the word counter of the problem computer goes to zero. Gates 15 and 17, when activated, respectively effect the gating out of the contents of address register 14 onto the multiplexor channel data input and the multiplexor channel address cables. The stages legended "drivers" and "terminators" indicate stages at the output of and the input to data register 18. It is noted that arrangement shown in FIG. 3 is in every ICCU of the arrangement.

When the count in the word counter of the control computer goes to zero, the transmission is completed.

While the invention has been particularly shown and described with reference to a preferred embodiment thereof, it will be understood by those skilled in the art that various changes in form and details may be made therein without departing from the spirit and scope of the invention.

What is claimed is:

1. A data processing system comprising:

a plurality of substantially interchangeable computers, each of said computers having its own memory, each of said computers being adapted to be selected as either a problem or a control computer whereby, by a chosen selection, one of said computers functions as said control computer and the remaining computers function as problem computers;

intercomputer communication control means in circuit with said computers for providing a control and data link between a selected control computer and the remaining problem computers, said intercomputer communication control means comprising:

respective intercomputer communication control units associated with each of said computers, and means for enabling communication between a computer and its associated intercomputer communication control unit;

means for enabling communication between all of said intercomputer communication control units;

file switch means in circuit with said computers and adapted to have a plurality of disk drives attached thereto;

transmission control means adapted to have a plurality of terminals attached thereto and operative to be placed in circuit with a selected control computer for providing a teleprocessing link between said terminals and said selected control computer, the number of terminals attached to said transmission control means being chosen to be equal to the number of said disk drives whereby each terminal is enabled to have one disk drive associated therewith, and input and output units controlled by the selected control computer.

* * * * *